United States Patent Office 3,446,872
Patented May 27, 1969

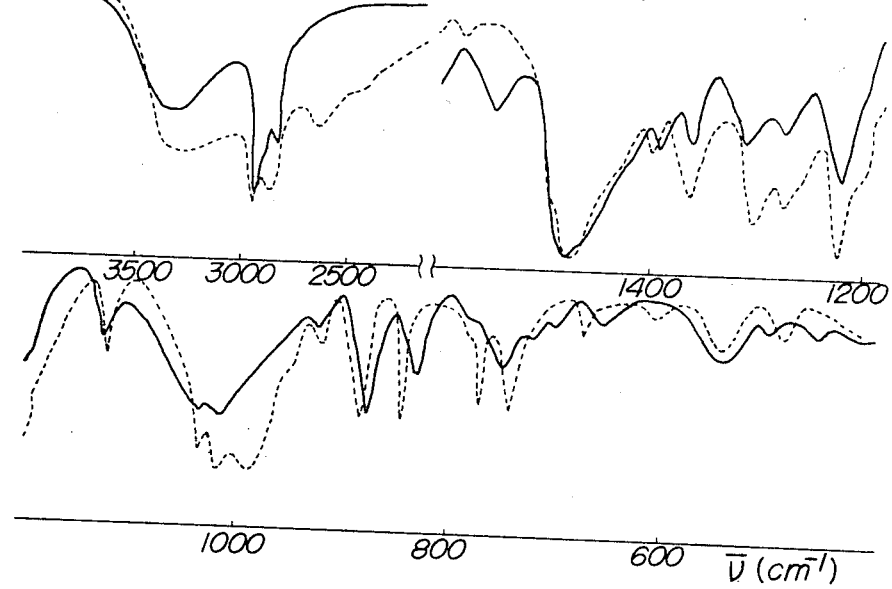
FIG. 3 (KBr disk)
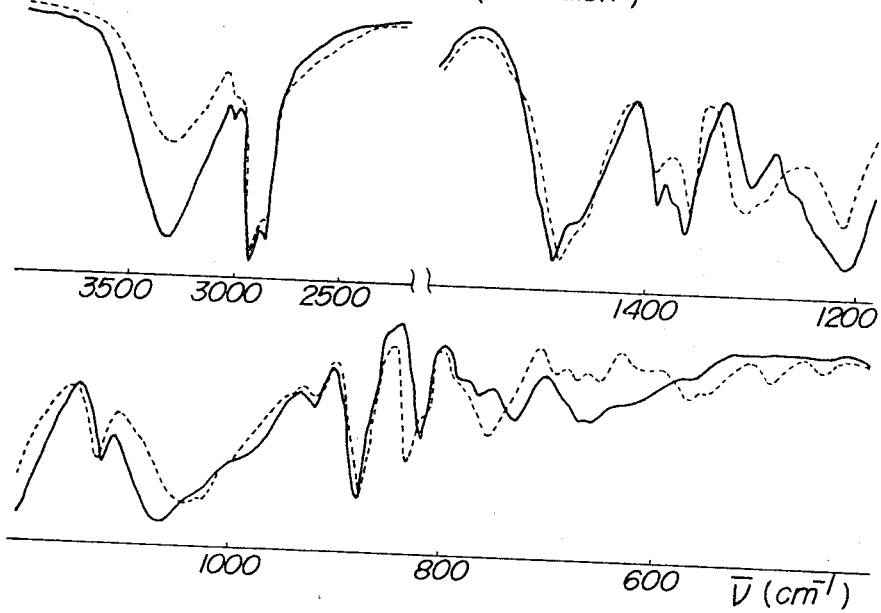
FIG. 4 (KBr disk)

3,446,872
COMPOSITIONS FOR POLYCHLOROPRENE
ADHESIVES
Takeshi Tanno, Ikutoshi Shibuya, and Masahiro Abo, Hitachi-shi, Japan, assignors to Hitachi Chemical, Ltd., Tokyo, Japan
Filed May 14, 1965, Ser. No. 455,738
Claims priority, application Japan, May 15, 1964, 39/27,202
Int. Cl. C08d 9/10; C09j 3/12
U.S. Cl. 260—845                             9 Claims

ABSTRACT OF THE DISCLOSURE

The present disclosure is directed to a polychloroprene adhesive composition consisting essentially of polychloroprene rubber and a chelate polymer obtained by heat-condensing a chelate compound at a temperature of 100° C. to 150° C., said chelate compound being prepared by reacting a salt of a 2,6-dimethylol derivative of p-substituted phenol with a polyvalent metal salt solution. The adhesive composition of the present disclosure exhibits an improved cohesive strength at relatively high temperatures as well as normal temperatures.

---

The present invention relates to compositions for polychloroprene adhesives. Polychloroprene adhesives are widely used as the common or industrial adhesives. Those have a high cohesive strength due to the crystallization of polychloroprene molecules at normal temperatures. The cohesive strength is, however, remarkably lowered by the melting of said crystals at a temperature above 50° C. and becomes unsuitable for practical use.

Therefore, for increasing the cohesive strength at a relatively high temperature and also at normal temperatures, polychloroprene adhesives are usually added with a heat-reactive alkylphenolic resin, as is described in U.S. Patent 2,610,910.

It is said that the heat-reactive alkylphenolic resin of this kind, for example, CKR 1634 (U.C.C. in U.S.A.) and Hitanol 2180 or 2181 (Hitachi Chemical Company in Japan), reacts with magnesia in the compositions for polychloroprene adhesives to form a kind of chelate compound, by which the cohesive or adhesive strength is increased at normal and higher temperatures.

Further, it is claimed according to U.S. Patent 2,918,442 that the heat-reactive alkylphenolic resin is reacted with magnesia in the non-polar solvent, a chelate compound obtained thereby is added to the polychloroprene adhesives and consequently the compositions for the polychloroprene adhesives thus obtained are improved in respect of the cohesive and adhesive strength at normal and higher temperatures. In those cases, it is also said that the composition which is obtained by the addition of a chelate compound prepared previously by reacting the heat-reactive alkylphenolic resin with magnesia is superior in stability to that prepared by adding the heat-reactive alkylphenolic resin as it is.

The present inventors have found that chelate compounds of polymethylol alkylphenols with polyvalent metal ions are heated at a temperature of 100° to 150° C. to prepare an improved, highly soluble and cosoluble, polymerized chelate compound. The polymerized chelate compound is mutually dissolved in polychloroprenes, whereby the polychloroprene compositions are improved in adhesive and cohesive strength at normal and higher temperatures.

The object of the present invention is to provide the compositions for polychloroprene adhesives having the high adhesive and cohesive strength which are added with an improved chelate compound prepared by heating the chelate compounds of polymethylol alkylphenols with polyvalent metal ions.

Figure 1:
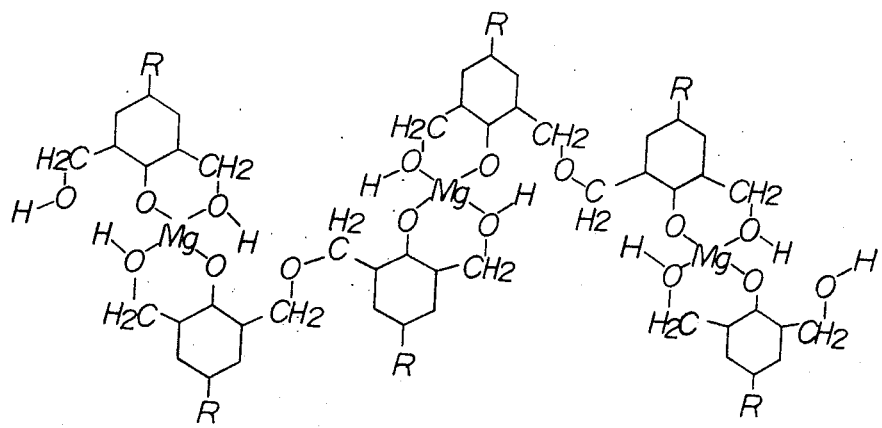
Figure 2:
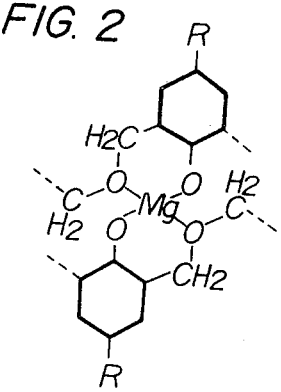

This improved chelate compound is supposed to have the chemical structure as shown in FIG. 1, according to its infra-red spectra. On the other hand, it is said according to K. Hultzsch (Kunststoffe, 53, 166 (1963)) that the conventional reaction products of the heat-reactive alkylphenolic resins with magnesia have the structure as shown in FIG. 2.

Therefore, the two are completely different from each other in respect to the synthetic process and the chemical structure, This is varified according to the infra-red absorption spectra. FIG. 3 shows the infra-red absorption spectra of the chelate compound (dotted line) of 2,6-dihydroxymethyl-4-tertbutylphenol with magnesium and the chelate compounds of improved quality prepared by heating (solid line). FIG. 4 shows the infra-red absorption spectra of Hitanol 2181 (solid line), the conventional heat-reactive alkylphenolic resin, and the chelate compound of said resin with magnesium (dotted line).

It was reported by Seebach et al. (Berichte, 72, 1635–38 (1939) and 73, 1338–46 (1940)) on some chelate compounds consisting of mono- or polymethylol alkylphenols and said polyvalent metal ions.

Those obtained chelate compounds, however, have hardly been used for those are very inferior in respect of solubility in the solvent and cosolubility with other compounds.

A proper amount less than 150 parts of the chelate compound improved by heating for 100 parts of polychloroprene rubber is added to the compositions for polychloroprene adhesives consisting partially or wholly of polychloroprene rubber, a solvent, an antioxidant, flowers of zinc, magnesia, alkylphenolic resins and other compounding agents.

As the amount of the chelate compound improved by heating is increased, the adhesive properties of the compositions of the chloroprene adhesives is raised and at the same time the tack retention time tends to be shortened. Therefore, the addition should be adjusted according to the requirements of the adhesive properties and the tack retention time. In general, it is desirable that the addition of the chelate compound is 10–70 parts.

The polymethylol alkylphenols used as the ligand according to the present invention have two methylol groups at the ortho positions are, for example, polymethylols of p-cresol, p - tertbutyl - phenol, p-octylphenol, p-phenylphenol, p-cumylphenol, Bisphenol A, etc.

The polyvalent metal ions coupled with the ligand according to the present invention are, for example, polyvalent ions of Mg, Ba, Zn, Cu, Fe, Co, Ti, Al, Sn, Pb and the like.

Prior to the preparation of the conventional polychloroprene adhesives, the chelate compound has been obtained by reacting the heat-reactive alkylphenolic resin with magnesia for several hours, while this process can be omitted by using the chelate compound according to the present invention and the preparing process of the adhesives can remarkably be shortened.

Examples are given below for the purpose of illustrating the present invention only, but not limiting the present invention. In the examples, "parts" are indicated by weight.

EXAMPLE 1

1 mol of sodium salt of 2,6-dihydroxymethyl-4-octylphenol is reacted with 0.5 mol of magnesium acetate in a mixture solvent consisting of water and dioxane (1:1), to immediately obtain the chelate compound in the form of white precipitate. According to the infra-red absorption spectra of the product, it is made clear that this phenol is coordinated with magnesium and the result of the analysis indicates the contained magnesium is 5.01%. This compound is suspended in toluene and heated, and the reaction is continued by removing the formed condensation water under azeotropic condition for about 2 hours, to obtain a yellow transparent solution. After removing the solvent, the chelate compound improved in quality by heating is obtained in the form of yellow fine powder.

The effects of the addition of this improved chelate compound to the chloroprene adhesives are given in the following table.

| Compounding [1] | Compounding examples | | | |
|---|---|---|---|---|
| | A | B | C | D |
| Neoprene AC (parts) | 100 | 100 | 100 | 100 |
| Magnesia-reactive resin (parts) [2] | | 50 | | |
| Chelate compound (parts) | | | 30 | 50 |
| Magnesia (parts) | 6 | 6 | 6 | 6 |
| Flowers of zinc (parts) | 5 | 5 | 5 | 5 |
| Peel strength test [3]—bright steel sheet/ canvas (kg./in.): | | | | |
| 20° C | 5.0 | 9.3 | 15.7 | 18.0 |
| 80° C | 0.7 | 2.5 | 3.0 | 3.3 |

[1] A 25% solution is prepared with toluene.
[2] Hitanol 2181 (made in Hitachi Chemical Company).
[3] Peel speed: 100 mm./min.

EXAMPLE 2

1 mol of sodium salt of 2,6-dihydroxymethyl-4-tert-butylphenol is reacted with 0.5 mol of magnesium chloride in ethanol, to immediately obtain the chelate compound in the form of white precipitate. According to the infra-red absorption spectra of the product, it is made clear that this phenol is coordinated with magnesium and the result of the analysis indicates the contained magnesium is 5.36%. This chelate compound (I) is of white powder and is gradually dissolved in methanol, ethanol and pyridine, but is almost insoluble in other organic solvents. This chelate compound (I) is heated in the form of powder at 120° C. for 5 hours, to obtain the chelate compound (II) improved in quality by heating, in the form of light yellow fine powder. The solubility and cosolubility of the chelate compounds (I) and (II) are given in the following table.

| Solvent or substance | Chelate compound (I) | Chelate compound (II) |
|---|---|---|
| Water | Insoluble | Insoluble. |
| Ethanol | Soluble (slow) | Soluble (fast). |
| Acetone | Insoluble | Soluble. |
| Methylethyl ketone | do | Do. |
| Ethyl ether | do | Do. |
| Benzene | do | Do. |
| Toluene | do | Do. |
| Carbon tetrachloride | do | Do. |
| Chloroprene rubber | Not cosoluble | Cosoluble. |

The effects of the addition of the chelate compound (II) to the chloroprene adhesives are given in the following table.

| Compounding [1] | Compounding examples | | |
|---|---|---|---|
| | A | B | C |
| Neoprene AC (parts) | 100 | 100 | 100 |
| Magnesia-reactive resin [2] (parts) | | 50 | |
| Chelate compound (II) (parts) | | | 50 |
| Magnesia (parts) | 6 | 6 | 6 |
| Flowers of zinc (parts) | 5 | 5 | 5 |
| Peel strength test [3]—bright steel sheet/ canvas (kg./in.): | | | |
| 20° C | 5.0 | 9.3 | 18.9 |
| 80° C | 0.7 | 2.5 | 3.0 |

[1] A 25% solution is prepared with toluene.
[2] Hitanol 2181 (made in Hitachi Chemical Company).
[3] Peel speed: 100 mm./min.

In the examples, the peel test was carried out according to ASTMD 903–49.

According to the present invention, the improved chelate compounds are prepared by heating a chelate compound of polymethylol alkylphenols with polyvalent metal ions and are effective being added to the compositions for polychloroprene adhesives for raising the adhesive and cohesive strength thereof.

What is claimed is:

1. A polychloroprene adhesive composition consisting essentially of about 100 parts by weight of polychloroprene rubber and about 10 to less than 150 parts by weight of a chelate polymer obtained by heat-condensing a chelate compound at a temperature of 100° C. to 150° C. for a period of about 2 to 5 hours, said chelate compound being prepared by reacting a sodium salt of a 2,6-dimethylol derivative of p-substituted phenol with a polyvalent metal salt solution.

2. The polychloroprene adhesive composition of claim 1, wherein the 2,6-dimethylol derivative of p-substituted phenol is a 2,6-dimethylol-4-alkyl phenol.

3. The polychloroprene adhesive composition of claim 2, wherein the 2,6-dimethylol-4-alkyl phenol is 2,6-dimethylol-4-tert-butylphenol.

4. The polychloroprene adhesive composition of claim 1, wherein the 2,6-dimethylol-4-alkyl phenol is 2,6-dimethylol-4-octylphenol.

5. The polychloroprene adhesive composition of claim 1, wherein the polyvalent metal salt solution is a solution of a salt of a metal selected from the group consisting of magnesium, zinc, copper, iron, cobalt, titanium, aluminum, tin, and lead.

6. The polychloroprene adhesive composition of claim 1, wherein said adhesive contains at least one additive selected from the group consisting of volatile organic solvents and antioxidants.

7. A polychloroprene adhesive composition consisting essentially of about 100 parts by weight of polychloroprene rubber and about 10 to less than 150 parts by weight of a chelate polymer obtained by heat-condensing a chelate compound at a temperature of 100° C. to 150° C. for a period of about 2 to 5 hours, said chelate compound being prepared by reacting a sodium salt of 2,6-dimethylol-4-tert-butylphenol with a salt solution of a metal selected from the group consisting of magnesium, aluminum and lead.

8. The polychloroprene adhesive composition of claim 7, wherein the metal salt solution is a salt of magnesium and the heat-condensation is effected at a temperature of about 120° C. for a period of about 2 to 5 hours.

9. The polychloroprene adhesive composition of claim 8, wherein the amount of the chelate polymer is about 10 to 70 parts by wight.

References Cited

UNITED STATES PATENTS 2,918,442  12/1959  Gerrard et al. _____ 260—845
3,144,428   8/1964  Kost _____ 260—845
3,185,658   5/1965  Garrett _____ 260—845

FOREIGN PATENTS 863,308  3/1961  Great Britain.

SAMUEL H. BLECH, Primary Examiner.

J. C. BLEUTGE, Assistant Examiner.

U.S. Cl. X.R.

156—333, 335; 260—32.8, 33.2, 33.4, 33.6, 33.8, 38, 59